(12) United States Patent
Ayme et al.

(10) Patent No.: US 8,500,072 B2
(45) Date of Patent: Aug. 6, 2013

(54) SUPPORT DEVICE FOR AN ELECTRICAL HARNESS PASSING THROUGH A STRUCTURE

(75) Inventors: Arnaud Camille Ayme, Toulouse (FR); Serge Thierry Roques, Cornebarrieu (FR)

(73) Assignee: Labinal, Blagnac (FR)

( * ) Notice: Subject to any disclaimer, the term of this patent is extended or adjusted under 35 U.S.C. 154(b) by 0 days.

(21) Appl. No.: 12/731,661

(22) Filed: Mar. 25, 2010

(65) Prior Publication Data
US 2010/0243294 A1  Sep. 30, 2010

(30) Foreign Application Priority Data
Mar. 25, 2009 (FR) .................................. 09 51914

(51) Int. Cl.
*F16L 3/08* (2006.01)

(52) U.S. Cl.
USPC ...... 248/74.1; 248/74.2; 174/153 G

(58) Field of Classification Search
USPC ......... 248/74.1, 74.2, 74.3, 74.4, 65, 228.8, 248/228.5, 230.5, 231.61, 231.85, 62; 174/156, 174/153 G; 16/2.2
See application file for complete search history.

(56) References Cited

U.S. PATENT DOCUMENTS

| | | | | |
|---|---|---|---|---|
| 4,656,689 A * | 4/1987 | Dennis | .............................. | 16/2.2 |
| 4,878,792 A * | 11/1989 | Frano | ............................. | 411/339 |
| 5,069,586 A * | 12/1991 | Casey | ............................. | 411/339 |
| 5,189,779 A * | 3/1993 | Fishel et al. | ..................... | 29/453 |
| 5,421,541 A * | 6/1995 | Condon | ........................... | 248/56 |
| 5,442,141 A * | 8/1995 | Gretz | ......................... | 174/153 G |
| 5,537,714 A * | 7/1996 | Lynch et al. | ...................... | 16/2.1 |
| 5,545,854 A * | 8/1996 | Ishida | ........................ | 174/153 G |
| 5,639,993 A * | 6/1997 | Ideno et al. | ............... | 174/153 G |
| 5,647,107 A * | 7/1997 | Brewster | ...................... | 24/713.6 |
| 5,772,380 A * | 6/1998 | Cloud et al. | .................... | 411/508 |
| 5,823,484 A * | 10/1998 | Barnard et al. | .................. | 248/72 |
| 5,950,277 A * | 9/1999 | Tallmadge et al. | .............. | 16/2.1 |
| D427,897 S * | 7/2000 | Johnston et al. | ............... | D8/395 |
| 6,151,759 A * | 11/2000 | Harward | .......................... | 16/444 |
| 6,328,513 B1 * | 12/2001 | Niwa et al. | ..................... | 411/339 |
| 6,374,455 B1 * | 4/2002 | Regele et al. | ..................... | 16/2.1 |
| 6,757,945 B2 * | 7/2004 | Shibuya et al. | .................. | 24/662 |
| 7,102,080 B2 * | 9/2006 | Nakamrura | .................... | 174/650 |
| 7,108,254 B2 * | 9/2006 | Kumper | ......................... | 267/276 |

(Continued)

FOREIGN PATENT DOCUMENTS

| | | |
|---|---|---|
| AD | 10 2007 018 332 A1 | 10/2008 |
| EP | 0 700 139 A1 | 3/1996 |
| GB | 2 451 426 A | 2/2009 |
| WO | WO 95/10845 | 4/1995 |

*Primary Examiner* — Nkeisha Smith
(74) *Attorney, Agent, or Firm* — Oblon, Spivak, McClelland, Maier & Neustadt, L.L.P.

(57) ABSTRACT

A support device for supporting at least one electric harness where it passes through a through hole in a composite material structure, the structure presenting two faces into which the hole opens out, the device including a first element made of dielectric material presenting a first bearing surface designed to be applied against one of the faces of the structure and a sleeve having a first end secured to the first bearing surface and having outside dimensions that are smaller than those of the hole so as to be capable of being inserted therein, and a second element made of dielectric material presenting at least one second bearing surface suitable for being applied against the other face of the structure.

20 Claims, 3 Drawing Sheets

(56) References Cited

U.S. PATENT DOCUMENTS

| | | |
|---|---|---|
| 7,150,439 B2 * | 12/2006 | Konold .................. 248/74.1 |
| 7,284,759 B2 * | 10/2007 | Heldmann et al. ............ 277/351 |
| 7,435,092 B2 * | 10/2008 | Grant .................. 439/34 |
| 7,726,090 B2 * | 6/2010 | Verelli et al. .................. 52/649.8 |
| 7,784,855 B2 * | 8/2010 | Faass et al. .............. 296/187.01 |
| 7,878,463 B2 * | 2/2011 | Kauppila ...................... 248/65 |

* cited by examiner

SUPPORT DEVICE FOR AN ELECTRICAL HARNESS PASSING THROUGH A STRUCTURE

BACKGROUND OF THE INVENTION

1. Field of the Invention

The present invention provides a support device for supporting at least one electric harness where it passes through a through hole in a structure made of composite material, and it also provides a structure equipped with said support device.

The invention applies particularly, but not exclusively, to the field of designing and manufacturing aircraft or similar devices.

2. Description of the Related Art

The main structural elements of new aircraft, currently under development, are made of composite materials having very high electrical resistance ($\approx$1000 times greater than aluminum) and low thermal conductivity ($\approx$half that of aluminum), with the main result that any injection of current into a part of the composite material structure may lead to said part being greatly damaged. In addition, the high abrasive potential of certain composite materials increases the probability of such an event after prolonged contact between an electric cable and a part made of composite material. By way of example, the effects on such parts may be local heating that may lead to a fire, and loss of the mechanical characteristics of the structure (delamination, etc.).

Currently, when an electric harness passes through an opening provided in a composite panel or part, a fastening system is needed to hold the electric cable harness in the through hole so as to avoid any contact between an electric cable of the harness and the periphery of the through hole provided in the composite material structure. However, if the system for fastening the harness on the structure is lost, there is nothing to prevent the harness from making contact with the composite material of the structure, with the above-mentioned drawbacks.

A possible solution may consist in duplicating the fastening of the harness relative to the structure by means of two supports situated on either side of the through hole. However, that proposal is expensive, heavy and lengthy to implement when fastening the harness where it passes through structures.

Accompanying FIG. 1 shows the problem to be solved. FIG. 1 shows a structure 10 made of composite material that, in the example under consideration, is constituted by a cross-member of the IPN beam type 12. This structure includes a vertical web 14 that presents two opposing faces 14a and 14b. Through holes such as 16 and 18 are provided in the web 14 in order to enable electric cable harnesses 20 to pass through. In the known solution for ensuring that the harness 20 does not come into contact with the edge 18a of the orifice 18, the harness is fastened to the structure, e.g. by a support 22 to which the periphery of the harness 20 is attached, e.g. by a collar 24. The other end 22a of the fastening element 22 is fastened to the web 14 of the structure 12 by any suitable means. As explained above, it should be understood that in the event of the fastening part 22 breaking, there is a high risk of the harness coming into contact with the periphery 18a of the through hole 18.

BRIEF SUMMARY OF THE INVENTION

A first object of the present invention is to provide a support device for supporting at least one electric harness where it passes through a through hole in a composite material structure, which device is simpler to implement than those described above while making it possible to increase safety, i.e. by very substantially reducing the risk of the composite material structure having its strength affected by contact with the harness.

To achieve this object, the invention provides a support device for supporting at least one electric harness where it passes through a through hole in a composite material structure, said structure presenting two faces into which said hole opens out, said device comprising a first element made of dielectric material presenting a first bearing surface designed to be applied against one of the faces of the structure and a sleeve having a first end secured to said first bearing surface and having outside dimensions that are smaller than those of said hole so as to be capable of being inserted therein, and a second element made of dielectric material presenting at least one second bearing surface suitable for being applied against the other face of the structure, said first and second elements being fastened together in the thickness of said sleeve by using at least one clip tab secured to one of said first and second elements and at least one clip notch provided in the other element.

Thus, the device of the present invention includes means for fastening together said first and second elements that are provided in the thickness of the sleeve and that comprise at least one clip tab secured to one of said first and second elements and at least one clip notch provided in the other element.

It should be understood that, after being assembled in the through hole, the first and second elements of the support device constitute a sort of ring made of dielectric material that completely covers the edge of the through hole in the composite material structure. Thus, even if the electric cable harness came into contact with said edge, the presence of the ring ensures that it makes no contact with the composite material constituting the structure.

It can also be seen that in view of its structure, assembling the protective ring in the through hole in the composite material structure is very simple since it merely requires the two elements of the support device to be clipped together.

It can be further understood that, by fastening the first and second elements together in the thickness of the sleeve, a clip tab projects from the sleeve, when said clip tab is secured to the first element, and a clip notch is provided in the thickness of the sleeve, when said clip notch is provided in the first element. As a result the device of the present invention can be assembled whatever the shape and dimensions of the hole in the structure, as long as the outside dimensions of the sleeve make it possible for said sleeve to be inserted in the hole.

For example, in non-limiting manner, it is thus possible to provide, a sleeve having outside dimensions that are adapted to those of the hole, and this makes it possible to position the device of the present invention in a manner that is stable relative to the structure.

Preferably, the first element is made as a single part.

Advantageously, said first and second elements are prevented from turning relative to the structure.

It should be understood that the support device can thus further include means for preventing turning of the first and second elements relative to the structure, the first and second elements being prevented from turning relative to the structure by using at least one member for preventing turning.

Advantageously, said first and second bearing surfaces have a shape that is circularly annular and said sleeve is circularly cylindrical.

Advantageously, at least one of said first and second elements presents a slot extending from its periphery, in such a manner as to be suitable for installation in situ when said electric harness is already installed.

Preferably, at least one of said first and second elements comprises at least one holder member configured to hold said electric harness relative to said first and second elements.

Thus, it should be understood that the support device further comprises holder means for holding the harness relative to the first and second elements.

Preferably, said first and second elements are made by molding, and said holder member is molded at the same time as said at least one of said first and second elements.

Thus, it should be understood that when the elements forming the protective ring are made by molding, the holder means are also made by molding at the same time as the element to which they are secured.

Advantageously, said holder member includes a support on which said electric harness is attached.

Thus, it should be understood that the holder means comprise a support and at least attachment means for attaching the harness to the support.

In a possibility provided by the invention, the clip tab is retractable.

Advantageously, the clip tab is equipped with clip catches and the clip notch is provided with locking catches.

Thus, it should be understood that fastening of the first and second element is performed by a number of clip catches of the clip tab co-operating with locking catches of the clip notch that depends on the thickness of the structure, in such a way that the device may thus be assembled on the structure whatever the thickness of said structure, as long as at least one clip catch of the clip tab is able to co-operate with at least one locking catch of the clip notch. Thus, as a result, the device of the present invention presents great modularity and may be more easily standardized so as to reduce manufacturing costs.

A second object of the present invention is to provide a composite material structure that is equipped with support means of the type mentioned above.

The composite material structure that is equipped with support means includes a through hole for an electric harness and two faces into which the through hole opens out and a support device of the type mentioned above in which the first and second elements are fastened together so that each bearing surface is applied against one of the faces of the structure.

Thus, according to the second object of the invention, the composite material structure, in which there is provided at least one through hole for an electric harness, presents two faces into which said hole opens out, and said structure includes at least one support device comprising a first element made of dielectric material presenting a first bearing surface designed to be applied against one of the faces of the structure and a sleeve having a first end secured to said first bearing surface and having outside dimensions that are smaller than those of said hole so as to be capable of being inserted therein, and a second element made of dielectric material presenting at least one second bearing surface suitable for being applied against the other face of the structure, said first and second elements being fastened together in the thickness of said sleeve by using at least one clip tab secured to one of said first and second elements and at least one clip notch provided in the other element.

BRIEF DESCRIPTION OF THE DRAWINGS

Other characteristics and advantages of the invention can be better understood on reading the following description of several embodiments of the invention, given by way of non-limiting examples. The description makes reference to the accompanying figures, in which:

FIG. 5 is a perspective view of a composite material structure that is equipped with the support device for supporting the electric cable harness where it passes through;

DETAILED DESCRIPTION OF THE INVENTION

With reference firstly to FIGS. 2 to 4A-4B and 7A-7B, there follows a description of the essential elements of the support device for supporting the electric harness where it passes through a through hole in a structure.

Figure 4A:
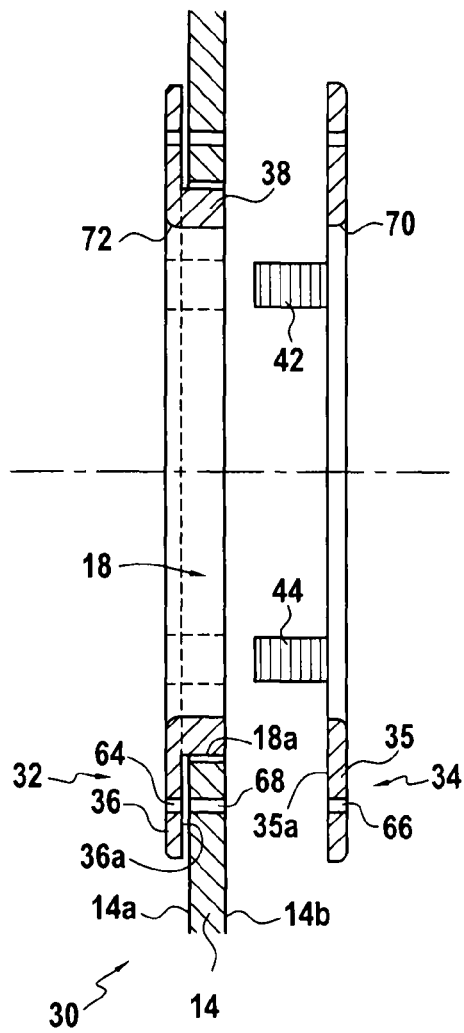
FIG. 4A is a vertical section view showing the complete support device before being assembled on the composite material structure.

The support device having the general reference 30 in FIG. 4A is constituted by a first element 32 and by a second element 34 that, when assembled together, constitute a protective ring for the harness. The first element 32 is constituted by a part 36 in the shape of a circular ring that, by means of its rear face 36a, defines a first bearing surface. Naturally, the shape of the support device is closely linked with the shape of the opening made in the structure 12.

This first element 32 further comprises a sleeve 38 that projects from the face 36a of the annular part 36. The outside diameter D1 of the element 32 is naturally larger than the diameter of the opening 18. The inside diameter D2 of the sleeve 38, and thus of the element 32 as a whole, is smaller than the diameter of the opening 18. Finally, the outside diameter D3 of the sleeve 38 is smaller than the diameter of the through hole 18, so that the sleeve 38 may be inserted in the opening 18.

The second element 34 of the support device 30 is constituted by a part 35 of circular ring shape having an outside diameter D'1 that is preferably equal to the outside diameter D1 of the element 32 and having an inside diameter D'2 that is substantially equal to the inside diameter D2 of the sleeve 38.

In order to make the protective ring, it is naturally necessary to fasten the elements 32 and 34 together after they have been put into place in the through hole 18. Preferably, the means for fastening the elements 32 and 34 together are made up firstly of clip tabs having references 42, 44 that are regularly spaced apart around the periphery of the element 34 and that project from the rear face 35a of the part 35 forming the element 34. These clip tabs are preferably equipped with clip catches. In order to co-operate with the clip tabs 42, 44, blind openings 48 to 54 are provided in the thickness of the sleeve 38, which openings are of shapes that are complementary to the clip tabs 42, 44, and so they are therefore also provided with locking catches.

Advantageously, the clip tabs 42, 44 are retractable with a simple tool, e.g. of the unlocking fork type, so as to enable the elements 32 and/or 34 to be replaced. Provision may also be made for weakening at least one of said clip tabs 42, 44, e.g. by means of an indentation or the like, making it possible for the clip tab 42, 44 to break at its base, or in a desired zone, when subjected to a force that is greater than the strength of the tab as weakened in this way, and acting parallel to the plane of the second bearing surface 35a or perpendicular to the linear axis of the tabs 42, 44.

Figure 4B:
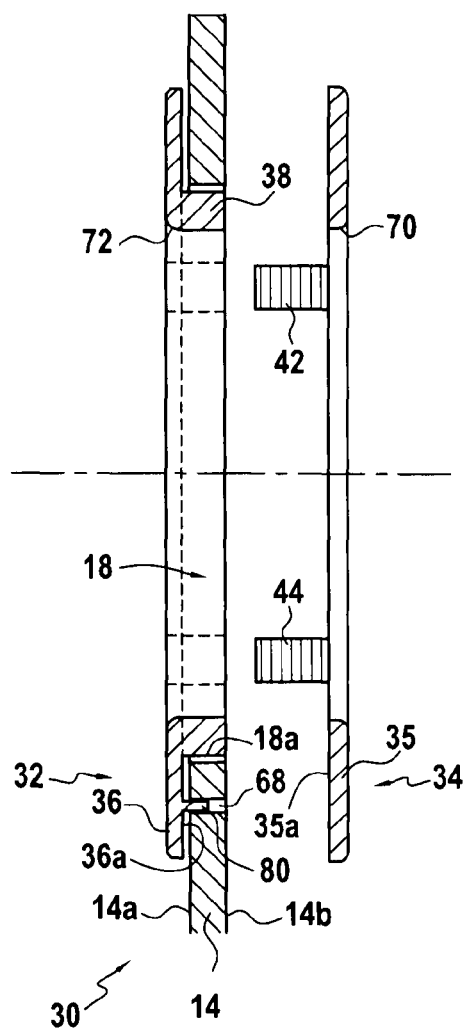
FIG. 4B is a section view showing a variant of the support device shown in FIG. 4A that makes it possible to prevent the parts that make up the support device from turning.

In addition, it is very desirable for the protective ring constituted by the assembled-together elements 32 and 34 to be prevented from turning in order to avoid friction phenomena if the electric harness accidentally comes into contact with said ring. To do this, the annular parts 36 and 35 of the elements 32 and 34 are preferably provided with respective orifices 64 and 66 that face an orifice 68 provided in the structure through which the electric harness passes. It then suffices to engage a screw or any suitable means in order to ensure that turning is prevented. A variant of this proposal of preventing turning may consist in substituting a positioning peg 80 for the orifices 64 and 66, which peg is integrated directly on the element 32 and/or 34 and is received in the orifice 68. In the example of FIG. 4B, the positioning peg 80 is present on the annular part 36 and is received in the orifice 68. In this way, the annular part 36 is fastened to the web 14 of the structure 12 and is prevented from turning relative to the web 14; once the annular part 35 is fastened to the part 36, the support device 30, constituted by the two elements 32 and 34, is prevented from turning on the structure 12. In complementary manner, a positioning peg may also be provided in the same manner on the annular part 35 for being received in the same orifice 38, it being understood that this solution is not essential for preventing said part 35 from turning because said clip tabs 42, 44 hold said part 35 and the annular part 36 together.

Preferably, and as can be better seen in FIG. 4A or 4B, the annular elements 35 and 36 have respective rounded portions 70 and 72 in such a manner as to reduce the possibly abrasive effect of the ring constituted by the elements 32 and 34, should the harness come into contact with said ring.

In the description given above, the through holes 18 under consideration are circular in shape. Naturally, it would not go beyond the ambit of the invention if the through holes were of a different shape, in particular of an oval or oblong shape for example, in order to enable two or more electric harnesses to pass through a single through hole. Naturally, the elements 32 and 34 would then need to be adapted to said different shape by providing oval or oblong shapes also for the annular plates 35 and 36 and for the sleeve 38.

Naturally, the elements 32 and 34 need to be made of a material that presents very high dielectric coefficient in order to ensure electrical insulation between the harness and the structure through which it passes, in the event of the harness coming into contact with the periphery 18a of the through hole 18, and also presenting a low abrasive potential in order to avoid damaging the cables in the event of prolonged contact.

Figure 5:
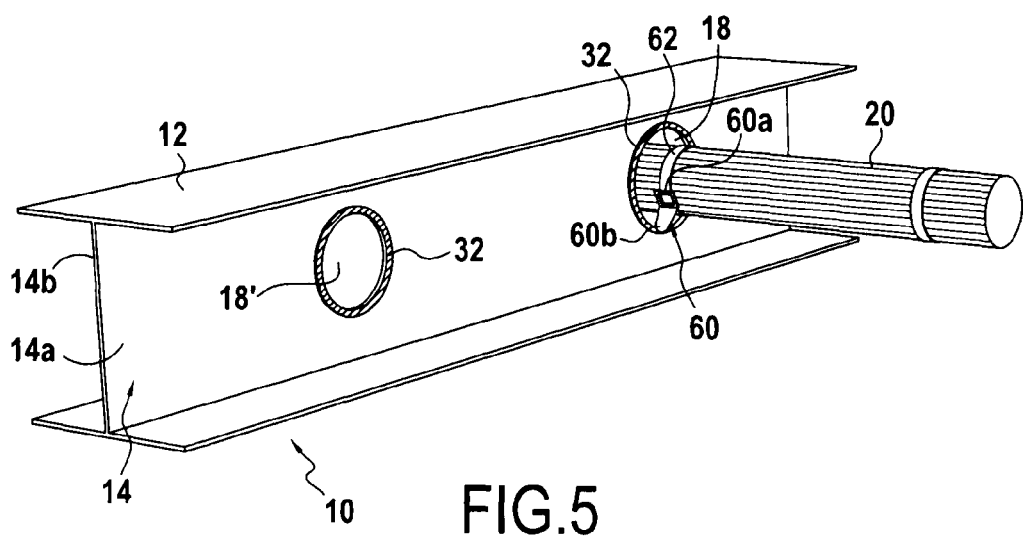
Figure 7A:
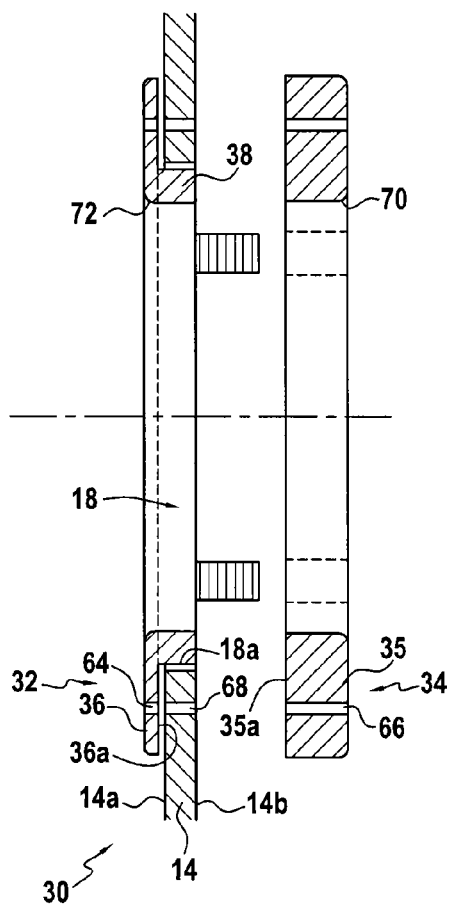
FIG. 7A is a vertical section view showing another embodiment of the complete support device before being assembled on the composite material structure.
Figure 7B:
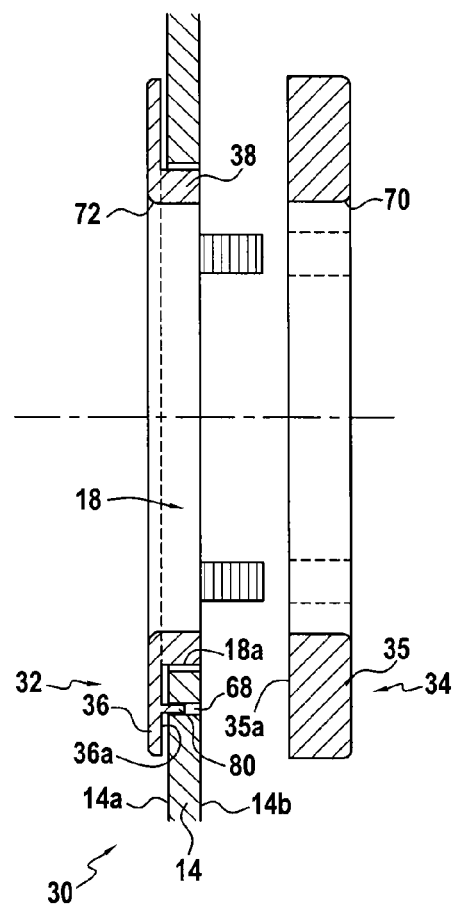
FIG. 7B is a section view showing a variant of the another embodiment of the support device shown in FIG. 7A that makes it possible to prevent the parts that make up the support device from turning.

FIG. 5 shows an example of assembling a support device of the invention. The elements 32 and 34 are presented on opposite sides of the support structure and they are clipped on to it by means of the clip tabs and clip orifices. The screw for preventing turning of the resulting protective ring is put into place. Preferably, the support device further comprises means for fastening the harness 20 to the protective ring constituted by the elements 32 and 34. To do this, it is possible to provide a fastening tab 60 having one end 60a fastened to the periphery of the harness 20, e.g. by means of a clamping collar 62, and having its other end 60 fastened to one of the parts 32 or 34 constituting the protective ring.

As explained above, even if the fastening means 60 break accidentally, any potential contact between the electric harness and the protective ring runs no risk of harming the mechanical properties of the composite material forming the structure 12.

Figure 1:
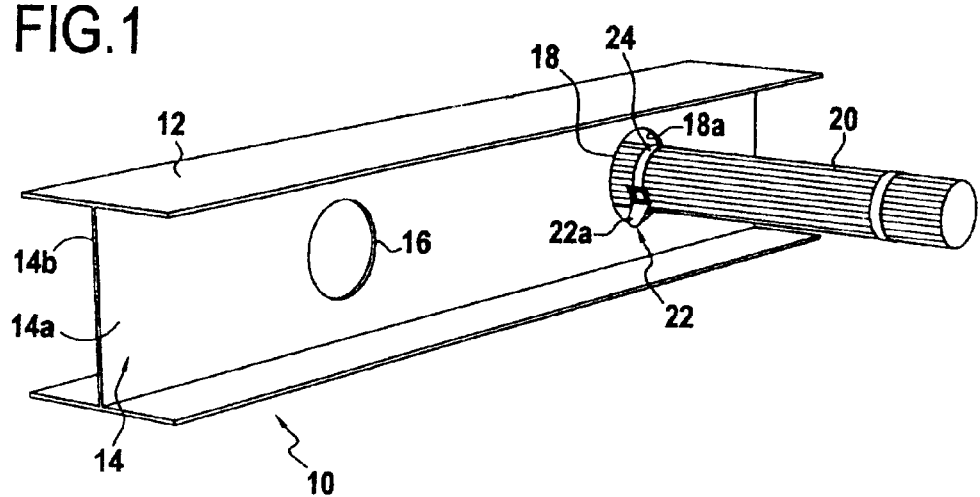
FIG. 1, described above, is a perspective view of a cross-member having known holder means for holding the harness where it passes through an opening made in the structure.
Figure 2:
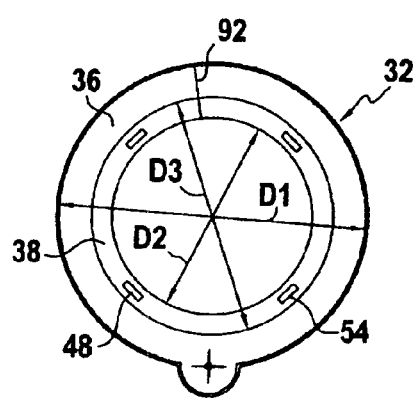
FIG. 2 is a face view of the first element of the support device.
Figure 3:
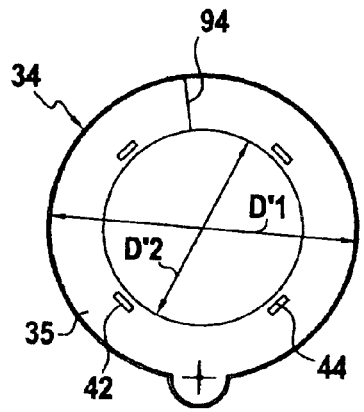
FIG. 3 is a face view of the second element of the support structure.

As can be seen in FIGS. 2 and 3 in particular, the elements 32 and 34 may present a slot 92, 94 extending radially at a single location of their periphery, and preferably at a top portion when the elements 32, 34 are installed in situ. The slot 92, 94 makes it possible, by bending the two ends, to engage said parts 32 and 34 on an already-installed harness without any risk of the harness being damaged and without any need to remove it. The selected material needs to be suitably flexible to enable said bending to be performed without risk of breaking.

The clip tabs 42, 44 should be retractable by means of a tool (an unlocking fork) in order to enable the elements 32 and 34 to be taken apart and replaced, where necessary (e.g. if they become damaged).

Figure 6:
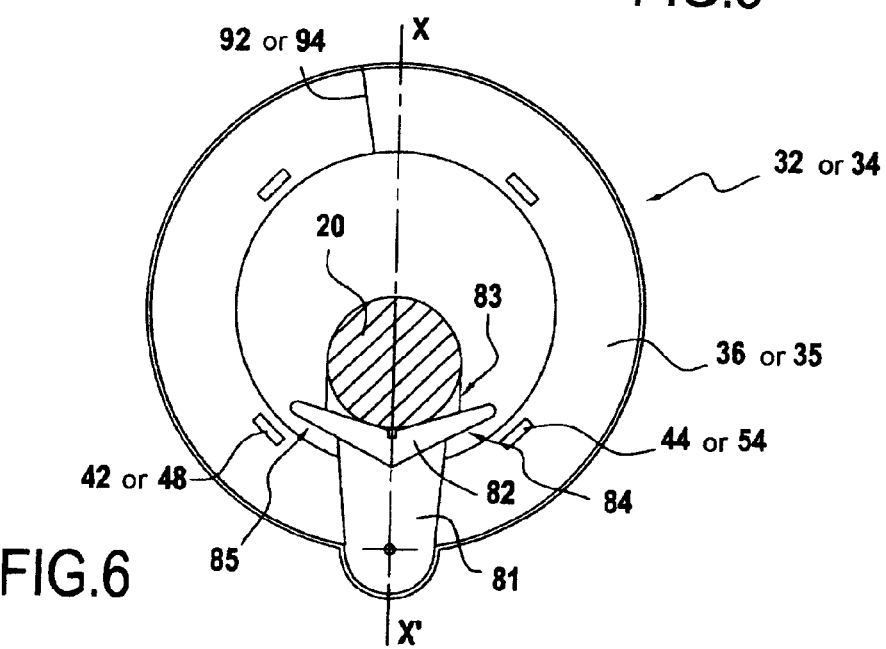
FIG. 6 is a face view showing a variant embodiment of the first and/or second element of the support structure.

A variant embodiment of the element 32 or 34 is shown in FIG. 6. In this embodiment, the annular portion 35 or 36 respectively of the parts 34 or 32 includes holder means 81 designed for positioning the harness 20. The holder means 81 include a support-forming top portion 82 advantageously presenting a shape that is adapted to positioning the harness 20 centrally. In the example selected to illustrate the invention, the support 82 of the holder means 81 presents a V-shaped section that is substantially flat. The harness 20 can thus be positioned on the support 82 by being wedged in the V-shaped portion that, preferably, coincides with the middle axis X'X of the element 32 or 34. In addition, in order to hold the harness 20 firmly on the holder means 81, a tie, e.g. of the "Tyrap" type, surrounds the harness 20 in order to hold it or retain it against the holder means 81. This tie 83, possibly a plurality of ties, is fastened by its two ends to the end portions 84, 85 of the support 82 of the holder means 81, by conventional means such as by adhesive or by inserting/blocking the ends of the tie 83 in respective slots provided in the two opposite ends 84, 85 of the support 82 of the holder means 81.

Naturally, the holder means 81 may present other shapes, and may for example comprise a tube or ring in which the harness 20 can be inserted and fastened. In addition, the symmetrical disposition on a mid-plane X'X is absolutely not necessary, in particular because the harness 20 is subsequently fastened to the holder means 81.

The invention claimed is:

1. A support device for supporting at least one electric harness, wherein said electric harness passes through a through hole in a composite material structure, said composite material structure presenting first and second faces into which said through hole opens out, said device comprising:
a first element made of dielectric material presenting a first ring portion with a first bearing surface designed to be applied against said first face of the composite material structure, and a cylindrical sleeve having a first end secured to said first bearing surface and a second free end, said sleeve having a thickness defined by an inner diameter and an outer diameter of said sleeve, said outer diameter of said sleeve being smaller than a diameter of said through hole so as to be capable of being inserted therein; and a second element made of dielectric material presenting a second ring portion with at least one second bearing surface suitable for being applied against said second face of the composite material structure, an inner diameter of said second ring portion being substantially equal to said inner diameter of said sleeve, wherein said first and second elements are fastened together in the thickness of said second end of said sleeve by at least one clip tab secured to said second ring portion of said second element and projecting axially from said second ring portion toward said first ring portion, and at least one clip notch provided in the thickness of said second end of said sleeve of said first element, and wherein at least one of said first and second elements comprises at least one holder member configured to hold said electric harness relative to said first and second elements.

2. A support device according to claim 1, wherein said first element is made as a single part.

3. A support device according to claim 1, wherein said first and second elements are prevented from turning relative to the structure.

4. A support device according to claim 1, wherein said first and second bearing surfaces have a shape that is circularly annular and said sleeve is circularly cylindrical.

5. A support device according to claim 1, wherein at least one of said first and second elements presents a slot extending from its periphery, in such a manner as to be suitable for installation in situ when said electric harness is already installed.

6. A support device according to claim 1, wherein said first and second elements are made by molding, and said holder member is molded at the same time as said at least one of said first and second elements.

7. A support device according to claim 1, wherein said holder member includes a support on which said electric harness is attached.

8. A support device according to claim 1, wherein the clip tab is retractable.

9. A support device according to claim 1, wherein the clip tab is equipped with clip catches and the clip notch is provided with locking catches.

10. A composite material structure, in which there is provided at least one through hole for an electric harness, said composite material structure presenting first and second faces into which said through hole opens out, and said composite material structure including at least one support device comprising:

a first element made of dielectric material presenting a first ring portion with a first bearing surface designed to be applied against said first face of the composite material structure, and a cylindrical sleeve having a first end secured to said first bearing surface and a second free end, said sleeve having a thickness defined by an inner diameter and an outer diameter of said sleeve, said outer diameter of said sleeve being smaller than a diameter of said through hole so as to be capable of being inserted therein; and a second element made of dielectric material presenting a second ring portion with at least one second bearing surface suitable for being applied against said second face of the composite material structure, an inner diameter of said second ring portion being substantially equal to said inner diameter of said sleeve, wherein said first and second elements are fastened together in the thickness of said second end of said sleeve by at least one clip tab secured to said second ring portion of said second element and projecting axially from said second ring portion toward said first ring portion, and at least one clip notch provided in the thickness of said second end of said sleeve of said first element, and wherein at least one of said first and second elements comprises at least one holder member configured to hold said electric harness relative to said first and second elements.

11. A support device for supporting at least one electric harness, wherein said electric harness passes through a through hole in a composite material structure, said composite material structure presenting first and second faces into which said through hole opens out, said device comprising:

a first element made of dielectric material presenting a first ring portion with a first bearing surface designed to be applied against said first face of the composite material structure, and a cylindrical sleeve having a first end secured to said first bearing surface and a second free end, said sleeve having a thickness defined by an inner diameter and an outer diameter of said sleeve, said outer diameter of said sleeve being smaller than a diameter of said through hole so as to be capable of being inserted therein; and a second element made of dielectric material presenting a second ring portion with at least one second bearing surface suitable for being applied against said second face of the composite material structure, an inner diameter of said second ring portion being substantially equal to said inner diameter of said sleeve, wherein said first and second elements are fastened together in the thickness of said second end of said sleeve by at least one clip tab secured to said second end of said sleeve and projecting axially from said second end toward said second ring portion, and at least one clip notch provided in the thickness of said second ring portion of said second element, and wherein at least one of said first and second elements comprises at least one holder member configured to hold said electric harness relative to said first and second elements.

12. A support device according to claim 11, wherein said first element is made as a single part.

13. A support device according to claim 11, wherein said first and second elements are prevented from turning relative to the structure.

14. A support device according to claim 11, wherein said first and second bearing surfaces have a shape that is circularly annular and said sleeve is circularly cylindrical.

15. A support device according to claim 11, wherein at least one of said first and second elements presents a slot extending from its periphery, in such a manner as to be suitable for installation in situ when said electric harness is already installed.

16. A support device according to claim 11, wherein said first and second elements are made by molding, and said holder member is molded at the same time as said at least one of said first and second elements.

17. A support device according to claim 11, wherein said holder member includes a support on which said electric harness is attached.

18. A support device according to claim 11, wherein the clip tab is retractable.

19. A support device according to claim 11, wherein the clip tab is equipped with clip catches and the clip notch is provided with locking catches.

20. A composite material structure, in which there is provided at least one through hole for an electric harness, said composite material structure presenting first and second faces into which said through hole opens out, and said composite material structure including at least one support device comprising:
- a first element made of dielectric material presenting a first ring portion with a first bearing surface designed to be applied against said first face of the composite material structure, and a cylindrical sleeve having a first end secured to said first bearing surface and a second free end, said sleeve having a thickness defined by an inner diameter and an outer diameter of said sleeve, said outer diameter of said sleeve being smaller than a diameter of said through hole so as to be capable of being inserted therein; and
- a second element made of dielectric material presenting a second ring portion with at least one second bearing surface suitable for being applied against said second face of the composite material structure, an inner diameter of said second ring portion being substantially equal to said inner diameter of said sleeve, wherein said first and second elements are fastened together in the thickness of said second end of said sleeve by at least one clip tab secured to said second end of said sleeve and projecting axially from said second end toward said second ring portion, and at least one clip notch provided in the thickness of said second ring portion of said second element, and wherein at least one of said first and second elements comprises at least one holder member configured to hold said electric harness relative to said first and second elements.

\* \* \* \* \*